United States Patent [19]

Martner et al.

[11] 4,313,380

[45] Feb. 2, 1982

[54] DISTRIBUTED CHARGE FOR SEISMIC PROSPECTING

[75] Inventors: Samuel T. Martner; Maurice E. Arnold, Jr., both of Tulsa, Okla.

[73] Assignee: Standard Oil Company (Indiana), Chicago, Ill.

[21] Appl. No.: 942,568

[22] Filed: Sep. 15, 1978

[51] Int. Cl.³ .......................... F42D 1/02; F42D 3/06
[52] U.S. Cl. .................... 181/116; 102/317; 102/320
[58] Field of Search ............... 102/21.6, 20, 22 R, 102/24 R, 23, 21.8; 181/116

[56] References Cited

U.S. PATENT DOCUMENTS

| | | | |
|---|---|---|---|
| 2,609,885 | 9/1952 | Silverman | 102/21.8 X |
| 2,770,312 | 11/1956 | Silverman | 102/21.6 X |
| 2,992,611 | 7/1961 | Felch | 181/116 X |
| 3,057,296 | 10/1962 | Silverman | 102/22 X |
| 3,064,570 | 11/1962 | Smith | 102/20 |
| 3,131,633 | 5/1964 | Eisler et al. | 102/24 R X |
| 3,154,013 | 10/1964 | Miller | 102/24 R X |
| 3,196,974 | 7/1965 | Barnes | 181/0.5 |
| 3,238,871 | 3/1966 | Lang | 102/20 |
| 3,285,171 | 11/1966 | Moore | 102/20 |
| 3,712,220 | 1/1973 | Marke et al. | 102/23 |

OTHER PUBLICATIONS

S. T. Martner et al., "Broomstick Distributed Charge", *Geophysics*, vol. XXVII, No. 6, Part II, pp. 1,007–1,015.

Primary Examiner—David H. Brown

[57] ABSTRACT

A distributed charge for use in producing a very sharp impulse for seismic prospecting comprises a series of lump explosive charges placed preferably of the order of at least 20 feet apart in a fluid in a well, connected with novel timed fuses. These fuses are each made of a short top section of a small diameter detonating linear explosive and a considerably longer, lower section which is a non-detonating linear deflagrator, terminating in a blasting cap inserted in the next lower lump explosive charge. The lower section is in the form of a thin-walled plastic tube lined with the active chemical agent. It may be crumpled or bent into various shapes including crossovers without serious problems of disconnection or premature initiation. Accordingly, axial length of each such fuse may be considerably more than the physical distance between the lump explosive charges.

6 Claims, 3 Drawing Figures

DISTRIBUTED CHARGE FOR SEISMIC PROSPECTING

BACKGROUND OF THE INVENTION

A distributed charge is an explosive assembly of elongated form and with a velocity of detonation in the direction of its length which is approximately that of seismic waves in the surrounding medium. In the case of land prospecting, this assembly is ordinarily detonated in a water-filled section of a well, and the velocity of the surrounding medium is that of the appropriate type of wave in the rock forming the walls of the well. In a marine environment it is the speed of compressional waves in water.

An article entitled "Broomstick Distributed Charge" by S. T. Martner and Daniel Silverman, Geophysics, Vol XXVII, No. 6, Part II, Pages 1,007–1,015 describes the background and general use of distributed charges in seismic surveying, and the types of charges then available. The greatest success obtained in this kind of charge had been achieved by wrapping a linear explosive cord known as Primacord ® (a trade name of the Ensign Bickford Company) wrapped in a helix around a length of material such as wood, plastic or rubber hose. The explosive material was the Primacord alone, and the choice of size of explosive and size and length of the mandrel was made so that the explosive detonation in an axial direction was about the same speed as the velocity of the generated seismic waves in the adjacent walls of the well. The article (and the associated U.S. Pat. No. 2,609,885 of D. Silverman) also showed that it was possible to place lump explosives, also called concentrated charges, along the helix to increase the pressure waves going into the well.

The type of arrangement of this distributed charge resulted in considerably greater ratio of downward to upward axial impulse than that of concentrated charges of equal mass. However, this charge was more expensive than such concentrated explosives. The fact that the helix was wound around the mandrel meant that in forceful loading of such a charge down a well there was likelihood of part of the helix being scraped away by contact with the walls. Also, it was found extremely difficult to waterproof such a distributed charge to the point that the distributed charge could be left for periods of up to or greater than 24 hours in a well before detonation time. Since seismic surveying practices frequently involve necessity of keeping the charge in a water-filled well longer than this period, there was considerable likelihood of misfire, with its attendant difficulties.

Lang in U.S. Pat. No. 3,238,871 teaches the use of an adjustable delay unit between lump explosive charges. The adjustable time delay element uses one single kind of linear explosive (usually light Primacord ®), but permits the adjustment of the physical lengths of the linear explosives in the delay unit by movement of one of two telescoping parts of the mandrel. These change the position of an explosive bridge so that the total length of linear explosive employed could be timed to correspond to the speed of seismic waves in the adjoining rock formation. The difficulty of this arrangement is that the use of such linear explosive cord lengths of which must naturally be bent back and close to other lengths is likely to result in sympathetic detonation across part of the cord, thus mis-timing the appropriate delay.

Silverman in his U.S. Pat. No. 2,770,312 teaches utilization of two different thick linear explosive materials having differing detonating velocities. One detonates at a rate of less than and the other greater than the speed of seismic waves in the surrounding medium. The low speed explosive (sometime called "sausage" powder) consisted of continuous cartridges of extra dynamite with a predetermined velocity dependent upon composition, encased in a plastic tube. By the proper choice of the lengths of the two parts, one can produce a distributed charge which approximates in propagation velocity the speed in the walls of the well. The "sausage" powder could not be made up in linear cords.

Axelson, et al., in U.S. Pat. No. 3,354,826 teaches a distributed charge for use under water, the explosive line charge being made of an explosive strip folded into a stack to form a part of a multiple explosive charge package. The explosive strip is approximately 20 times as long as it is wide and has a thickness of less than 1/30 of its width. Here again, the difficulty lies in the fact that, if the explosive strip is arranged in such a physical shape that part of it is in proximity to another part, there is great probability of sympathetic detonation across the part of the strip and hence malfunctioning of the timing.

A different arrangement was taught in U.S. Pat. No. 3,211,094 Liddiard. In order to shape the detonation wavefront in an explosive charge, a shaped metal plate was interposed between a booster charge and a working charge. The front phase of this plate is conical in shape, with the center part thicker than the edges. This causes the center part of the booster charge to be accelerated first and the outer parts accelerated later. Since the local velocity of the plate varies inversely with the thickness, the front of the plate is deformed to produce a plane surface striking the working charge simultaneously over the entire area. This of course does not produce a distributed charge to the type mentioned above, with the desirable property of matching the speed of seismic waves in the adjoining medium.

Barns in his U.S. Pat. No. 3,196,974 eliminates the timing fuse feature of the distributive charge. Instead his distributed charges are made up of arbitrarily placed lump charges in the well, each of which has associated with it a seismic detector type initiator. By detonating the top explosive, for example with a cap, a seismic wave starts down the walls of the well. Each time a pressure sensitive switch located along the column is energized, it sets off a blasting cap in a lump charge at that point in the well. Such a distributed charge is dangerous to deploy. It is not frequently used. Phase blasters use a similar idea. These are detonators actuated by pressure developed by arrival of the compressional wave from another charge in the same borehole. Such devices were used for a time but were never really considered safe.

Finally, Marke, et al., have issued U.S. Pat. No. 3,712,220 in which the initiating line of detonating cord is used as in the distributed charge described in the first article and the Silverman Pat. No. 2,609,885. Here, however, extra weight of explosive is involved by using explosive adhesively stuck to the detonating cord or attached by a layer of adhesive. This also results in considerable difficulties when loading the hole.

In the past, it has been found that the performance of the distributed charge was very poor when lump explosives were introduced into the assembly. Results were outstanding using the broomstick charge when the required charge size (on the order of 5 lb.) permitted the use of Primacord ® only. However, once the lump explosives were inserted at intervals along the broomstick charge to achieve additional charge weight, the performance was much less satisfactory. Evidently, poor coupling occurred for reasons that were not altogether understood. There are many areas in the Mid Continent area that require charges larger than 5 lb. to obtain adequate depth penetration. In the Wyoming Rockies area for example, charges of 50 lb. and more are almost a necessity.

In the Gulf Coast, formation velocities are 6,000 ft/sec. and less. Velocities that low cannot be matched using "sausage" powder. This velocity required if broomstick charges were to be used, that the Primacord ® be wrapped at a low angle of pitch. When this was done, these charges often cross detonated. Because of this problem, distributed charges were seldom used in operations in the Gulf Coast area. There is a definite need for distributed charges in that area because of the interest in obtaining high frequencies necessary for stratigraphic trap exploration. Also, it is often necessary to shoot 25 lb. or more of explosive in a charge, in order to obtain sufficient penetration.

In the past, it was necessary when using a distributed charge to load and fire the shot within one or two days. If the charge, for any reason, was left to "sleep" longer than that, it was not likely to be successfully detonated. Present technology of recording multifold data requires that a seismic line be drilled and loaded for a week or longer before moving onto the line with a recording truck and the geophone cables. Consequently, it is now essential that the distributed charge be capable of "sleeping" for a week or longer. In the configuration described below, there is little or no limitation based on time between loading and time of shooting such a distributed charge.

SUMMARY OF THE INVENTION

A new type of distributed charge for use as a seismic source in geophysical prospecting is shown. It makes use of a plurality of lump charges of explosive located at predetermined distances apart, preferably uniformly spaced. Charges are connected by time-delay fuses. The distance between the charges is chosen such that the time delay of the fuses in detonation is such that each succeeding lump charge is detonated after that above it at a time which permits at least approximate matching of the effective velocity of detonation in the direction of the length of the elongated charge to the seismic velocity of appropriate type waves in the surrounding medium. This may be water or the rock formations around a water-filled section of a shot hole drilled in subsurface formations.

Each charge at its bottom end is connected through a blasting cap to a short but effective length of detonating cord, such as Primacord ®, an elongated detonating linear explosive. Below this and connected to it is a non-detonating linear deflagrator with a detonation velocity considerably below that of the detonating cord. It in turn terminates in another blasting cap inserted in the next lower lump charge.

Preferably the physical spacing between adjacent lump charges is controlled by a mechanical, non-detonating framework such as a suitable cable.

This arrangement has proved effective as a distributed charge for seismic prospecting using lump charges under essentially all the field conditions found in geophysical prospecting. Particularly notable is the fact that the explosive can "sleep," that is, it can be left for periods in excess of 24 hours in water or in the water-filled section of a shot hole and still will adequately detonate serially the various lump charges. It is relatively easy to force this distributed charge into such a well without causing mechanical abrasion or tearing apart of any section of the various timing fuses. Frequently no loading poles are needed to place the charge and instead it can be run in on a weight.

BRIEF DESCRIPTION OF DRAWINGS

Three drawings have been appended to this specification and form a part of it. They are to be read in connection with the written description. In these drawings, the same reference numeral in more than one figure refers to the same or a corresponding part.

DESCRIPTION OF PREFERRED EMBODIMENT

Reference has been made above in the background section to the purpose and operation of a distributed charge; this will not be repeated here. Prior examples of the distributed charge have been quite expensive, there was difficulty in some experimental embodiments, there was also difficulty in causing adequate detonation of the timing fuse between adjacent lump charges caused by the shock wave near a detonated lump charge; the assemblage frequently could not be made sufficiently watertight so that a shot hole could be loaded and the charge satisfactorily detonated a day or several days later, and the fact that in particular it was not possible easily to adjust the velocity of the detonating lump charges to match the propagating velocity of waves in the surrounding medium. In addition, it was difficult to load many types of distributed charge without physically abrading or tearing apart a timing fuse.

Figure 1:
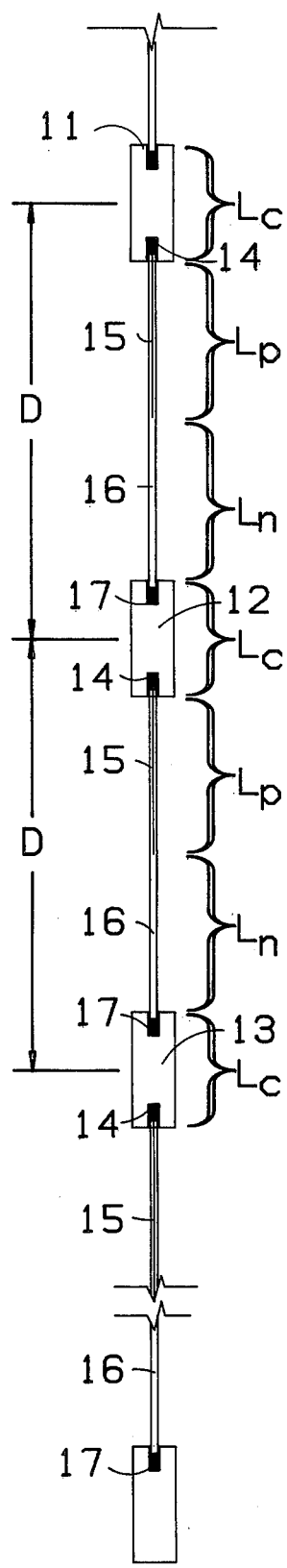
FIG. 1 shows in symbolic form the suitable minimum equipment forming an appropriate distributed charge in accordance with our invention.

The present invention is well-adapted to overcome these difficulties. Referring now to FIG. 1, there is shown in diagrammatic form three lump charges 11, 12, and 13; more may be used if desired. These preferably have essentially a common axial length $L_c$. They are shown one below another with an opening 14 in the bottom of each charge. This permits physically attaching to a short but effective length of detonating cord for fuse 15 to the bottom of each charge. While not limited to it, we prefer to use Primacord ® or Primaline ®, which are linear detonating explosive cords obtainable from the Ensign Bickford Company in the United States. This material is available with a detonation velocity under ordinary conditions of about 21,000 feet per second, and with explosive weights of varying amounts. We prefer to employ such detonating cords having weights of explosive of about 7 grains per foot. The length of this material is shown as $L_p$ in FIG. 1.

It in turn is connected in detonating type contact to a non-detonating linear deflagrator 16 having a length $L_n$. This in physical form appears as a thin walled plastic tube of about ⅛ inch diameter. Such material is available commercially under the trade name Nonel ® from the Ensign Bickford Company. It is a thin, tough, plastic tube carrying a thin coating of reactive material on the inside surface. When this material is initiated, the tube reliably transmits a small energy signal from one point to another by means of a shock wave (phenomenon of deflagration) much akin to a dust explosion. This deflagration propagates inside the tube around sharp bends and kinks. Even if two sections of such material are in physical contact, there does not appear to be any cross-detonation. The detonation velocity is about 6,000 feet per second. Such a linear deflagrator is normally obtained carrying a blasting cap 17 attached to the lower end. It is in detonating type contact with the next lump charge explosive below.

As mentioned above, we prefer (mainly for simplicity) to keep the distance D between adjacent lump charges approximately constant. A satisfactory spacing is of the order of 20 to 30 feet, for example. The time between detonation of, say, charges 11 and 12 is given by the simple equation $$\Delta t = D/V \qquad (1)$$

where D is the distance between adjacent charges, $\Delta t$ is the required difference in time of detonation of the lower charge compared to that of the upper, and V is the velocity of propagation of the desired waves in the medium adjacent the lump charges 11, 12, 13, etc.

The particular velocity V to which the distributed charge is to be matched depends upon the effect to be secured from the distributed charge. In the past, this velocity has largely been that of compressional waves in the adjoining medium, which in the case of shot holes is that of the earth formations. Of course, if it is desired to generate other waves such as shear waves, an appropriately lower velocity V is applied in the equations.

Reliability of operation of the distributed charge is ensured by using a short but effective length of the detonating material 15 in the fuse. It is frequently forgotten that the shock wave from each lump charge upon detonation is initially considerably above the detonation velocity of the nondetonating linear deflagrator 16. The minimum effective length $L_p$ of the detonating fuse is needed on the immediate downstream side of each lump charge to prevent the shock wave set up by the lump charge from physically disarranging or breaking the upper end of the length of non-detonating linear deflagrator 16. This can be about 3 inches if the lump charge size is about 1 pound to about 6 inches if the lump charge size is about 10 pounds. This is referred to in some claims as a short but effective length.

Appropriate lengths for the detonating cord and for the non-detonating linear deflagrator (the lengths $L_p$ and $L_n$ in FIG. 1) for such a distributed charge can be calculated by the following two formulas:

$$L_n = \frac{V_n V_p (LV_c - L_c V)}{VV_c(V_p - V_n)} - \frac{V_n(L - L_c)}{(V_p - V_n)} \qquad (2)$$

$$L_p = L - L_n - L_c \qquad (3)$$

where:
L = Total effective length of detonating cord 15 plus linear deflagrator 16 plus lump-charge = D
D = Distance between centers of lump-charges
V = Seismic-wave velocity of surrounding rock co-linear with distributed charges
$L_c$ = Length of each lump-charge
$L_p$ = Length of detonating cord
$L_n$ = Length of nondetonating linear deflagrator $V_p$ = Velocity of detonation of detonating cord
$V_n$ = Velocity of detonation of linear deflagrator
$V_c$ = Velocity of lump-charge If, when using the above formulas, the velocity V is small enough, the length $L_p$ may be calculated to be less than the minimum short length of the detonating fuse 15 desired on the immediate downstream end of the lump charge. In such a case, the minimum length of the linear deflagrator 16 required between adjacent lump charges is $$L_n = V_n \left[ \frac{D}{V} - \frac{L_{pm}}{V_p} - \frac{L_c}{V} \right] \qquad (4)$$

where:
$L_{pm}$ = minimum length of detonating cord permitted.

When using this last formula, or where L is selected to be greater than D, the total length of detonating cord 15 and non-detonating linear deflagrator 16 between successive lump charges will exceed the physical distance between such charges. The excess of the linear deflagrator 16 can be coiled or wadded at the downstream end of the latter material since the propagation of chemical activity occurs within this latter material.

The exact velocities of propagation of the detonating cord ($V_p$), of the linear deflagrator ($V_n$), and of the lump charge ($V_c$), and the axial velocities of the completed distributed charges under various conditions of hydraulic pressure or the like can be determined by timing methods which are already well-known to those skilled in the art of measuring such velocities. Recent field tests conducted in the field at a test site near Mounds, Oklahoma established propagation velocities $V_p$ and $V_n$ at 21,000 and 6,400 ft/sec. respectively, for Primaline ® and for Nonel ® at ambient pressures up to 150 psi.

Figure 2:
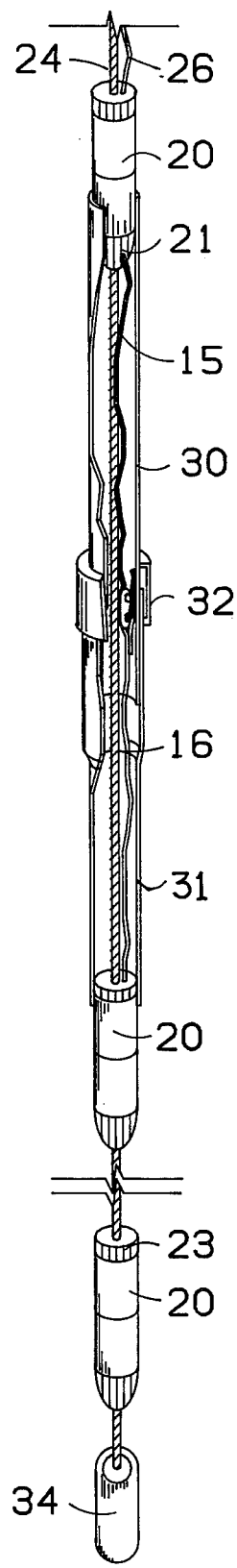
FIG. 2 shows a sketch of an actual assemblage of apparatus in accordance with our invention.

A preferred embodiment of this invention is shown schematically in FIG. 2. In this case, the lump charges are shown made up of an explosive packed in a seamless steel can fitted with male and female threads on opposite ends so that it is possible to make up several units by simply screwing them together. One such material easily obtainable in the United States is referred to as "Nitramon" ® S Primer, which is obtainable from E. I. du Pont de Nemours and Company. One such Primer (or one such Primer and one or more attached "Nitramon" ® S units) is used for each lump charge. These are shown in FIG. 2 as 20.

Figure 3:
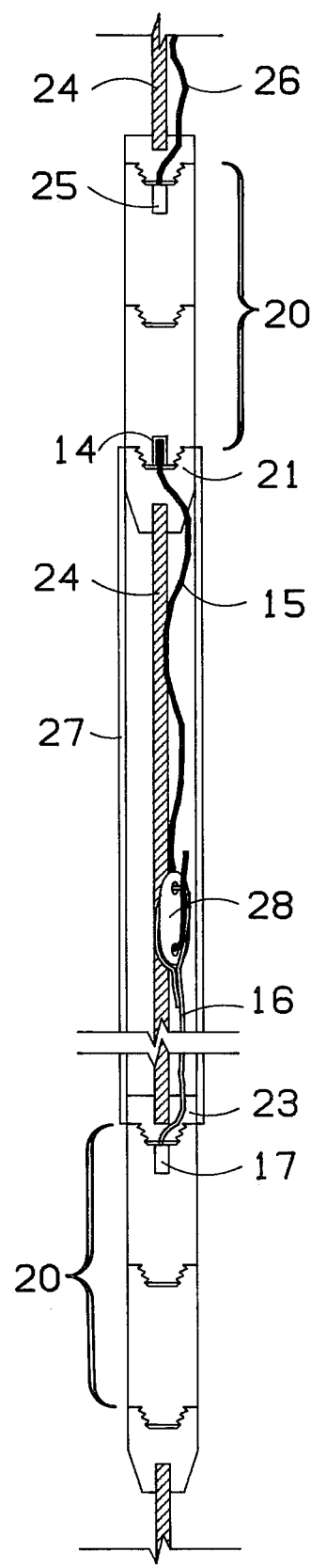
FIG. 3 shows in cross-section and somewhat more detail a basic arrangement of FIG. 2.

The assembly between each successive lump charge, which could be called a "delay assembly" or a timed fuse, is shown more particularly in FIG. 3. It is made up of a "Nitramon" ® S Point or similar female-threaded device 21 with a hole into which is securely fastened the upstream end of the linear detonating explosive 15 (for example made of Primaline ®) of length $L_p$ with its downstream end looped or similarly fastened to be in close physical contact with the upper end of the non-detonating linear deflagrator 16 of length $L_n$ (preferably made of Nonel ®), which is fitted at the lower extremity with a blasting cap 17, for example a #8 seismograph blasting cap or equivalent, and a ¢Nitramon" ® S shield 23 or similar male-threaded device at the lower end into which the cap 17 is secured. The total delay assembly from unit 21 to unit 23 during use is screwed as shown to the upstream and downstream lump charges (20).

We prefer to predetermine the distance between adjacent lump charges by a physical framework which, as shown in FIG. 3, can be a separate strain wire or cable 24. This takes the strain off the Primacord ® unit 15 and the deflagrator unit 16 while holding the lump charges 20 at the proper interval D apart. Obviously, this framework is chemically inert during detonation.

The entire distributed charge is preferably suspended from another strain wire or cable 24 which is attached to a unit similar to 23. The upper end of the top lump charge 20 is provided with a seismic blasting cap 25 suitably supplied with electric insulated leads 26 leading up to the blaster.

Frequently the use of rigid tube members enclosing the delay assemblies between the lump charges is indicated. This can be accomplished by a single rigid tube 27, made for example out of a plastic with the order of 1/16 inch radial thickness walls, and an entire diameter of the order of 2 inches, as shown in FIG. 3 surrounding the delay assembly, or it can be made up, as shown in FIG. 2, of two (or more) telescoping tubes 30 and 31 provided with a center clamping means 32 to hold them rigidly a fixed distance between opposite outer ends. These tubes may be made of the same material, for example, as that discussed in connection with FIG. 3. This type of arrangement is particularly important in areas where the shot holes are of such a nature that the distributed charges will not readily sink in the shot hole by their own weight, or by attaching a sinker bar such as unit 34 shown in FIG. 2 or by pulling the charges into the hole with a preplaced pulley at a lower point in the hole. As mentioned above, the length of the linear deflagrator 16 can be coiled or wadded or jammed within the confines of tubes such as tubes 27, or 30 and 31, which furnish mechanical protection to the delay assembly while the charge is being loaded with loading poles in a shot hole.

It is to be noted that the telescoping tube arrangement shown in FIG. 2 permits the distance between the adjacent lump charges to be set up at whatever length is desired. The ends of the tubes 30 and 31 adjacent to the lump charges may be rigidly attached to the appropriate S point, but we have found that even temporary expedients such as attaching the end of a tube 31 to its adjacent charge by friction tape to be quite adequate.

Field tests at Mounds (mentioned earlier) established complete absence of cross-detonation of the Nonel ® linear deflagrator, even when detonated without removal from the shipping package. They also proved that a distributed charge as described detonated successfully 26 days after being loaded in the water-filled part of a shot hole.

It is to be recognized that manufacturing details, for example, and other particularities have been avoided in order to make the teaching as brief as possible. Those skilled in the art to which this specification is directed, will recognize other means of accomplishing the desired ends. The specification is not intended to be a limitation, particularly as to the detailed description. The invention is best limited by the scope of the appended claims.

We claim:

1. A distributed charge for seismic prospecting, to be used to match a velocity V of seismic waves in a medium comprising:
   a plurality of connected lump charges each connected below to a short but effective length of a linear explosive with velocity of detonation $V_p$ which in turn is connected below to a longer piece of a nonexploding linear deflagrator with velocity of propagation $V_n$; where $V_n$ is considerably less than $V_p$, said linear deflagrator terminating below in a blasting cap which is in contact with the adjacent lump charge below;
   said linear explosive and said linear deflagrator forming the sole active chemical means between adjacent lump charges;
   the length of any one of said lump charges plus one length of said linear explosive plus one length of said linear deflagrator between said adjacent lump charges being designated as D, which length is predetermined such that the time lapse between explosion of two adjacent lump charges is at least approximately D/V.

2. A distributed charge in accordance with claim 1 in which:
   the length of the short but effective length of said linear explosive has a minimum value in the range between about 3 and about 6 inches, and
   each said linear deflagrator is in the form a long narrow, thin-walled tube lined with the active deflagrating material.

3. A distributed charge in accordance with claim 2 in which each of said lump charges is held in place essentially at a fixed spacing D by a non-detonating mechanical support other than said linear explosive and said linear deflagrator.

4. A distributed charge in accordance with claim 3, in which the lengths $L_n$ of said linear deflagrator and $L_p$ of said linear explosive are related to the length D between corresponding points of said adjacent lump charges at least approximately by the following expressions $$L_n = \frac{V_n V_p ([D] L V_c - L_c V)}{V[I] V_c (V_p - V_n)} \div \frac{V_n (L - L_c)}{(V_p - V_n)} \text{ and } L_p = L - L_n - L_c$$

where:
   $L_c$ equals length of each lump charge,
   $V_p$ equals velocity of detonation of said linear explosive,
   $V_c$ equals velocity of detonation of said lump charge,
   $V_n$ equals velocity of detonation of said deflagrator.

5. A distributed charge in accordance with claim 4, including
   a length of thin-walled rigid tube at least substantially enclosing the length $L_n$ of said linear deflagrator and $L_p$ of said linear explosive.

6. A distributed charge in accordance with claim 4 including between each of said adjacent lump charges:
   a plurality of sets rigid tubes, the tubes in each set telescoping into each other, each said set enclosing the lengths $L_n$ of said deflagrator and $L_p$ of said linear explosive, and
   clamping means for maintaining the effective length of each such set at about $(D-L_c)$.

* * * * *